United States Patent
Kaeriyama (10) Patent No.: US 6,987,601 B2
(45) Date of Patent: Jan. 17, 2006

(54) DAMPED CONTROL OF A MICROMECHANICAL DEVICE

(75) Inventor: Toshiyuki Kaeriyama, Ibaraki-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 129 days.

(21) Appl. No.: 10/749,432

(22) Filed: Dec. 31, 2003

(65) Prior Publication Data

US 2004/0246554 A1    Dec. 9, 2004

Related U.S. Application Data

(60) Provisional application No. 60/472,079, filed on May 20, 2003.

(51) Int. Cl.
G02B 26/08    (2006.01)

(52) U.S. Cl. .................. 359/295; 359/291; 359/298; 345/85; 310/22; 310/36; 310/90; 348/771

(58) Field of Classification Search ............... 359/214, 359/223–225, 230, 234, 245, 295, 290–293, 359/298, 846, 848, 850; 345/84, 85; 310/22, 310/36, 90; 348/755, 764, 770, 771
See application file for complete search history.

(56) References Cited

U.S. PATENT DOCUMENTS

| | | | |
|---|---|---|---|
| 4,662,746 A | 5/1987 | Hornbeck | |
| 4,956,610 A | 9/1990 | Galm et al. | |
| 5,061,049 A | 10/1991 | Hornbeck | |
| 5,083,857 A | 1/1992 | Hornbeck | |
| 5,096,279 A * | 3/1992 | Hornbeck et al. | 359/230 |
| 5,583,688 A | 12/1996 | Hornbeck | |
| 5,706,123 A | 1/1998 | Miller et al. | |
| 5,764,208 A | 6/1998 | Burton et al. | |
| 5,768,007 A | 6/1998 | Knipe et al. | |
| 5,771,116 A | 6/1998 | Miller et al. | |
| 5,867,302 A * | 2/1999 | Fleming | 359/291 |
| 5,912,758 A | 6/1999 | Knipe et al. | |
| 6,008,785 A | 12/1999 | Hewlett et al. | |
| 6,154,305 A * | 11/2000 | Dickensheets et al. | 438/24 |
| 6,282,012 B1 * | 8/2001 | Kowarz et al. | 359/291 |
| 6,583,921 B2 | 6/2003 | Nelson | |
| 6,891,657 B2 * | 5/2005 | Hewlett et al. | 359/291 |

* cited by examiner

Primary Examiner—Evelyn A. Lester
(74) Attorney, Agent, or Firm—Charles A. Brill; Wade James Brady, III; Frederick J. Telecky, Jr.

(57) ABSTRACT

Device and method for a damping function to reduce undesirable mechanical transient responses to control signals. In one aspect of the present invention, the damping function may be used to reduce overshoot and oscillation when a digital micromirror is driven from a landing plate to the flat or neutral position. In another aspect of the present invention, the damping function may be used to reduce transient resonance of a digital micromirror when the micromirror is driven to a landing plate.

14 Claims, 10 Drawing Sheets

DAMPED CONTROL OF A MICROMECHANICAL DEVICE

This application claims the priority benefit of U.S. Provisional Application Ser. No. 60/472,079, entitled "Damped Reset for a Digital Micromirror Device," filed on May 20, 2003, which application is hereby incorporated herein by reference.

CROSS-REFERENCE TO RELATED APPLICATIONS

This application relates to the following co-filed and commonly assigned patent applications: Ser. No. 10/749,497 (now allowed), filed on Dec. 31, 2003, entitled "Damped Control of a Micromechanical Device;" and U.S. Pat. No. 6,891,657 B2, filed on Dec. 31, 2003, entitled "Damped Control of a Micromechanical device," which applications are hereby incorporated herein by reference.

TECHNICAL FIELD

The present invention relates generally to micro-mechanical devices, and more particularly to a device and method for damping the movable elements of such devices.

BACKGROUND

Generally, video display systems based on spatial light modulators (SLMs) are increasingly being used as an alternative to display systems using cathode ray tubes (CRTs). SLM systems generally provide high resolution displays without the bulk and power consumption of CRT systems.

One type of SLM is a digital micromirror device (DMD). Digital micromirror devices have also been called deformable micromirror devices, although that term generally is now used to describe devices that operate in an analog mode. DMDs may be used for either direct-view or rear or front projection display applications. A DMD has an array of micro-mechanical display elements, each having a tiny mirror that is individually addressable by an electronic signal. Depending on the state of its addressing signal, each mirror tilts so that it either does or does not reflect light to the image plane. The mirrors may be generally referred to as "display elements," which correspond to the pixels of the image that they generate. Generally, displaying pixel data is accomplished by loading memory cells connected to the display elements. After a display element's memory cell is loaded, the display element is reset so that it tilts in the on or off position represented by the new data in the memory cell. The display elements are able to maintain the on or off state for controlled display times.

In the prior art, a reset sequence generally is used to drive a DMD pixel. The reset sequence generally comprises 5 steps including (1) memory write, (2) reset, (3) release and differentiation, (4) landing and latch, and (5) stabilization. This cycle, including mechanical switching time, generally takes about 15 $\mu$sec to complete. While a bias voltage is applied, the micromirror is electro-mechanically latched, allowing update of memory data for the next reset sequence.

One potential disadvantage with the mechanical nature of a DMD mirror is that a transient response typically is seen just after the mirror tip (spring tip) lands on a landing plate. Then the response gradually decays in accordance with a receiving resistance from ambient gas at about one atmosphere pressure. The resonant vibration seen in a transient response generally originates from the physical structure of the micromirror. A transient frequency of the mirror may be about 450–550 kHz, although the value may vary depending on the specific application. Data loading to an SRAM under the micromirror generally is performed after the response declines to a level that is low enough to guarantee the prevention of a micromirror malfunction. Therefore a stabilization period is required to remove mechanical instability in the switching operation of a micromirror. This time may take up two-thirds of the mechanical switching time.

In general, the total response time is composed of the mechanical switching time and the data loading time for a mirror section, which time determines the minimum cycle time. This directly relates to an LSB time for binary pulse width modulation techniques in controlling gray levels, which generally determines the color bit depth on a DMD system.

Generally, bit depth requirements are increasing the need for shorter LSB times on SLM projectors. In the prior art, a fast clear technique has been used to achieve high bit depth. Generally, fast clear is a function whereby all mirrors are sent to a flat state by a single voltage change. Fast clear, however, may be reliable to only as low as about 14 $\mu$sec t-wait time (approximately 15 $\mu$sec cycle time). Moreover, even at that level, there may be a significant yield loss.

Alternatively, a reset-release function has been used in the prior art to achieve high bit depth. The reset-release technique can provide a shorter cycle time (e.g., 8 $\mu$sec) than the fast clear technique. A reset-release pulse is used to cause a display element to assume an unaddressed flat state, in which the display element "floats." During this float time, the next address state is loaded. Then a bias value is reapplied and the display element assumes the new address state. The use of reset-release display times is described in U.S. Pat. No. 5,764,208 entitled "Reset Scheme for Spatial Light Modulators," and U.S. Pat. No. 6,008,785, entitled "Generating Load/Reset Sequences for Spatial Light Modulators," each of which patents is assigned to Texas Instruments Incorporated and incorporated herein by reference.

One potential disadvantage with the prior art reset-release pulse sequence is that it may introduce a significant loss in contrast (e.g., about 30%). In addition, it may introduce a potential residual image artifact with hinge memory over the device lifetime. These disadvantages generally are due to a significant overshoot of the mirror into the pupil of the optical system after launch.

SUMMARY OF THE INVENTION

These and other problems are generally solved or circumvented, and technical advantages are generally achieved, by preferred embodiments of the present invention which utilize a damping function to reduce undesirable mechanical transient responses to control signals. In one aspect of the present invention, the damping function may be used to reduce overshoot and oscillation when a DMD mirror is driven from a landing plate to the flat or neutral position. In another aspect of the present invention, the damping function may be used to reduce transient resonance of a DMD mirror when the mirror is driven to a landing plate.

In accordance with a preferred embodiment of the present invention, a method for operating a digital micromirror device having at least one micromirror comprises applying a reset voltage pulse to the micromirror. The reset voltage causes the micromirror to launch from a landing plate. Then an offset voltage is applied to the micromirror immediately after the reset voltage pulse. The offset voltage is applied for a damping delay period. The micromirror launches and is moving away from the landing plate before an expiration of the damping delay period. A damping pulse is applied to the micromirror immediately after the offset voltage, and then the offset voltage is reapplied to the micromirror. The damping pulse generally reduces oscillation of the micromirror about the neutral position. In one preferred embodiment, the damping pulse voltage is equal to the reset voltage, while in another preferred embodiment the damping pulse voltage is equal to a bias voltage for the micromirror.

In accordance with another preferred embodiment of the present invention, a system for operating a digital micromirror device having at least one micromirror comprises applying a reset voltage pulse to the micromirror, then applying an offset voltage to the micromirror immediately after the reset voltage pulse. A bias voltage is applied to the micromirror immediately after the offset voltage. The bias voltage is applied for a damping delay period. A triangular damping pulse is applied to the micromirror after the damping delay period, and then the bias voltage is reapplied to the micromirror. The triangular damping pulse generally reduces a transient resonant vibration of the micromirror on a landing plate.

An advantage of a preferred embodiment of the present invention is that it provides more stable and reliable mechanical switching operation, and enables shorter mechanical switching time that allows less minimum expose time and increased color bit depth. This in turn may provide a reduction in video noise and contouring.

A further advantage of a preferred embodiment of the present invention is that it provides increased yield. In particular, while the LSB may be a damped reset-release bit, the next bit, which may be fast clear, may be significantly longer. Thus, fast clear wait time may be increased, which relaxes the criteria for yield.

Another advantage of a preferred embodiment of the present invention is that there generally is no need to change the current DMD pixel design, structure, or process (except for modifying control functions to implement the damping function).

Yet another advantage of a preferred embodiment of the present invention, when used to dampen mirror resonance on landing on a landing plate, is that there may be less mechanical friction between the mirror landing tip and the mirror landing plate, resulting in less mechanical wear on the passivation layer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a DMD with a damped reset and release. The invention may also be applied, however, to other types of spatial light modulators, to other micro-electromechanical system ("MEMS") devices having movable elements that move in response to electrostatic attraction, or to other MEMS devices utilizing transient control of movable elements.

One application of DMDs is for forming images where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, the mirror element need not be reflective. Also, in some applications, the DMD is operated in an analog rather than a digital mode. In general, the term "DMD" is used herein to include any type of micro-mechanical device having at least one hinge-mounted deflectable element that is spaced by an air gap from a substrate, relative to which it moves.

Figure 1:
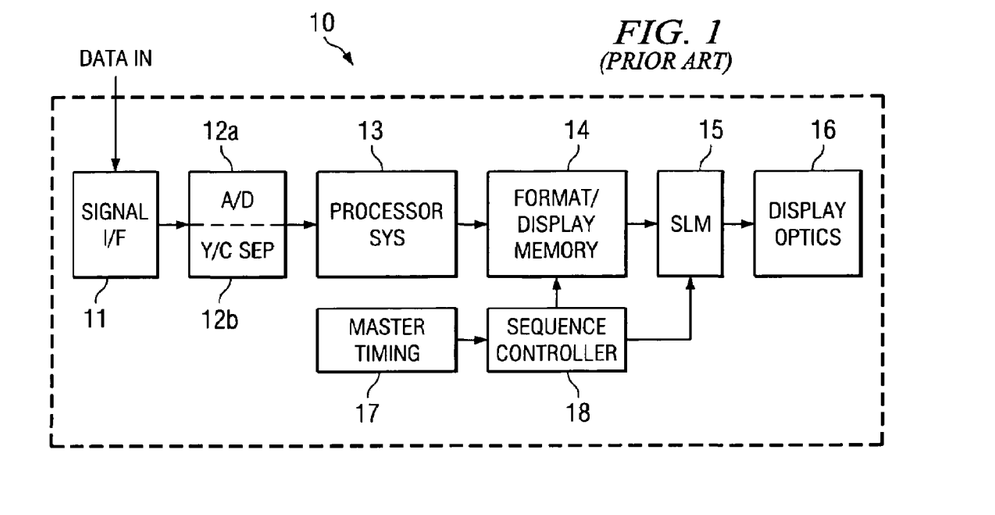
FIG. 1 is a block diagram of a spatial light modulator display system.

With reference now to FIG. 1, there is shown an example of a typical projection display system 10. System 10 uses SLM 15 to generate real-time images from an input signal, such as a broadcast television signal. In the example of this description, the input signal is analog, but in other embodiments the input signal could be digital, eliminating the need for A/D converter 12a. Generally, only those components significant to main-screen pixel data processing are shown. Other components, such as might be used for processing synchronization and audio signals or secondary screen features, such as closed captioning, are not shown.

Each display element of the SLM 15 has a memory cell, which is loaded with one bit of data at a time. The one bit of data in memory for all display elements comprises a bit-plane. The instance of displaying a given bit-plane is referred to herein as a "segment," and a bit-plane may be displayed in one continuous segment or in multiple segments distributed throughout a frame.

After its memory cell is loaded, the display element is reset to the state represented by the data in the memory cell. This loading and resetting process occurs in a particular sequence of loads and resets generated by sequence controller 18. Sequence controller 18 delivers control signals following this sequence to the frame memory 14 for loading and to SLM 15 for resetting.

In one implementation, system 10 may have a divided reset configuration. The sequence generation process classifies segments according to the length of their initial display times. It then allocates actual display times so that segments having shorter display times can be loaded during a prior segment. The shortest of these short display times are treated as "reset-release" display times, which call for reset-releases in the sequence. It also prevents reset conflicts between reset sequences of any two or more groups. In another implementation, system 10 may have a global reset system. In the case of a global reset system, using concepts similar to those discussed above, the process may classify segments and provide for short and reset-release display times.

Signal interface unit 11 receives an analog video signal and separates video, synchronization, and audio signals. It delivers the video signal to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion.

Processor system 13 prepares the data for display by performing various pixel data processing tasks. Processor system 13 may include whatever processing memory is useful for such tasks, such as field and line buffers. The tasks performed by processor system 13 may include linearization to compensate for gamma correction, colorspace conversion, and interlace to progressive scan conversion. The order in which these tasks are performed may vary.

Display memory 14 receives processed pixel data from processor system 13. It formats the data, on input or on output, into "bit-plane" format, and delivers the bit-planes to SLM 15. The bit-plane format permits each display element of SLM 15 to be turned on or off in response to the value of one bit of data. Display memory 14 may provide bit-plane data to be displayed on the rows of the SLM that are associated with a designated group.

In one implementation of display system 10, display memory 14 is a "double buffer" memory, which means that it has a capacity for at least two display frames. The buffer for one display frame can be read out to SLM 15 while the buffer for another display frame is being written. The two buffers are controlled in this manner so that data is continuously available to SLM 15. SLM 15 uses the data from display memory 14 to address each display element of its display element array.

Display optics unit 16 has optical components for receiving the image from SLM 15 and for illuminating an image plane such as a display screen. For color displays, the display optics unit 16 includes a color wheel, to which a sequence of bit-planes for each color is synchronized. In an alternative embodiment, the bit-planes for different colors could be concurrently displayed on multiple SLMs and combined by the display optics unit.

Master timing unit 17 may provide various system control functions to sequence controller 18 and may provide system control functions to other components in system 10. As discussed previously, sequence controller 18 provides reset control signals to SLM 15 and load control signals to display memory 14.

Figure 2:
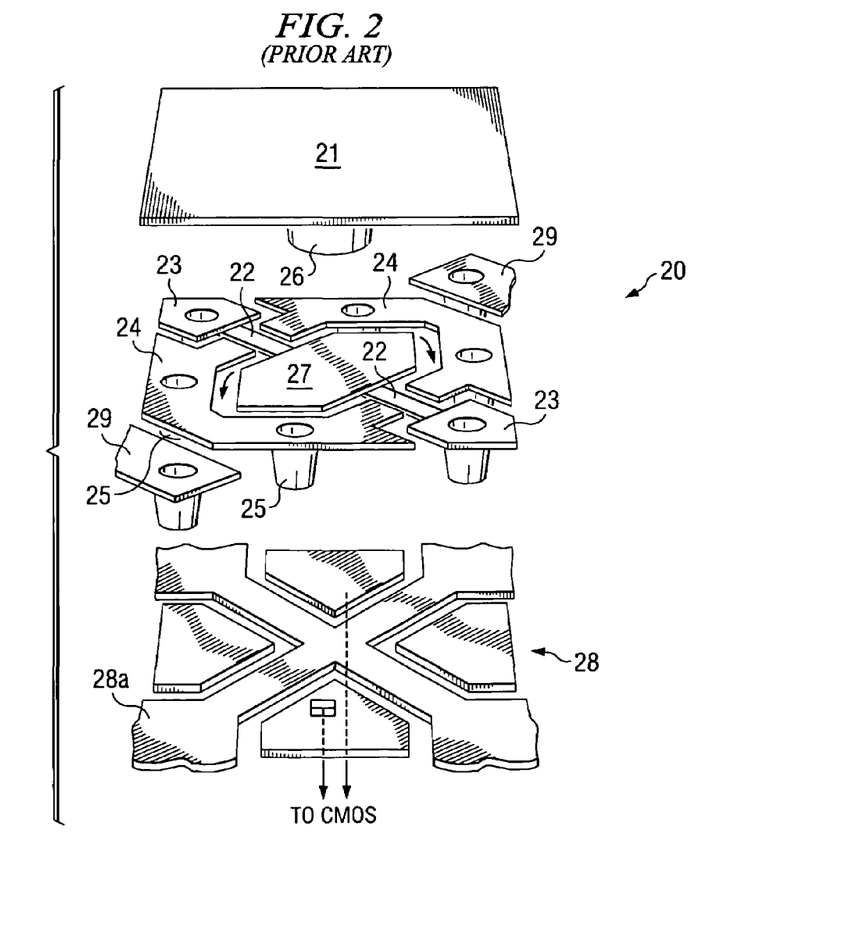
FIG. 2 is an exploded perspective view of a DMD mirror element.

With reference to the display elements in SLM 15, FIG. 2 is an exploded perspective view of a single mirror element 20 of a DMD. In FIG. 2, mirror 21 is shown undeflected, but as indicated by the arrows, its torsion hinges 22 permit it to be deflected in either of two directions.

Mirror element 20 of FIG. 2 generally is known as a "hidden hinge" mirror element. Other types of mirror elements 20 may be fabricated, including a "torsion beam" type, described below in connection with FIG. 3, where the mirror is mounted directly to the hinges instead of over a yoke to which the hinges are attached. Various DMD types are described in U.S. Pat. No. 4,662,746, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-Level Deformable Mirror Device"; and U.S. Pat. No. 5,583,688, entitled "Improved Multi-Level Micro-Mirror Device." Each of these patents is assigned to Texas Instruments Incorporated and each is incorporated herein by reference.

As with other hidden hinge DMD designs, hinges 22 of mirror element 20 are supported by hinge support posts 23, which are formed on a substrate. Address electrodes 24 are supported by address electrode support posts 25, which are on the same level as hinges 22 and hinge support posts 23.

Mirror support post 26 is fabricated on yoke 27. Yoke 27 is attached to one end of each of the two hinges 22. The other end of each hinge 22 is attached to a hinge support post 23. The hinge support posts 23 and the electrode support posts 25 support hinges 22, address electrodes 24, and yoke 27 over a substrate having a control bus 28a. When mirror 21 is tilted, the tip of mirror 21 contacts a landing site 29. Address electrodes 24 have appropriate electrical connections to memory cells (not shown), which are typically fabricated within substrate 28 using CMOS fabrication techniques.

Figure 3:
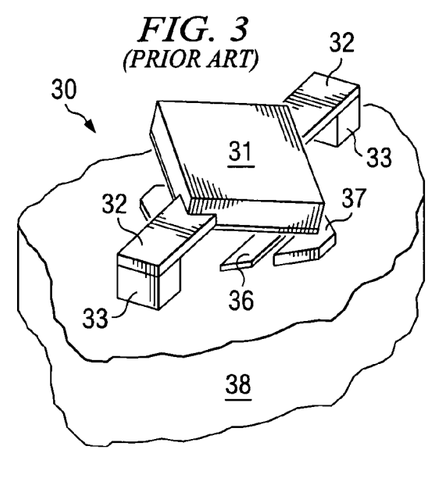
FIG. 3 is a perspective view of another type of DMD mirror element.

FIG. 3 illustrates mirror element 30 of a "torsion beam" type DMD. In this type of DMD, hinges 32 are not hidden, but rather extend from opposing sides of mirror 31. Hinges 32 are attached to hinge support posts 33. Address electrodes 36 provide attractive forces for tilting mirror 31, which touches a landing pad 37. Mirror element 30 is fabricated over a substrate 38 of memory cells and control circuitry.

In operation for image display applications, and using an array of mirror elements 30 for example, a light source illuminates the surface of the DMD. A lens system may be used to shape the light to approximately the size of the array of mirror elements 30 and to direct this light toward them.

Voltages based on data in the memory cells of substrate 38 are applied to the address electrodes 36. Electrostatic forces between the mirrors 31 and their address electrodes 36 are produced by selective application of voltages to the address electrodes 36. The electrostatic force causes each mirror 31 to tilt either about +10 degrees (on) or about −10 degrees (off), thereby modulating the light incident on the surface of the DMD. Light reflected from the "on" mirrors 31 is directed to an image plane, via display optics. Light from the "off" mirrors 31 is reflected away from the image plane. The resulting pattern forms an image. The proportion of time during each image frame that a mirror 31 is "on" determines shades of gray. As previously discussed, color can be added by means of a color wheel or by a three-DMD setup.

In effect, the mirror 31 and its address electrodes 36 form capacitors. When appropriate voltages are applied to mirror 31 and its address electrodes 36, a resulting electrostatic force (attracting or repelling) causes the mirror 31 to tilt toward the attracting address electrode 36 or away from the repelling address electrode 36. The mirror 31 tilts until its edge contacts landing pad 37.

Once the electrostatic force between the address electrodes 36 and the mirror 31 is removed, the energy stored in the hinges 32 provides a restoring force to return the mirror 31 to an undeflected or equilibrium position. Appropriate voltages may be applied to the mirror 31 or address electrodes 36 to aid in returning the mirror 31 to its equilibrium position. Various types of voltages and waveforms that may be applied to the mirror are described in U.S. Pat. No. 6,008,785, entitled "Generating Load/Reset Sequences for Spatial Light Modulator"; U.S. Pat. No. 5,912,758, entitled "Bipolar Reset for Spatial Light Modulator"; U.S. Pat. No. 5,771,116, entitled "Multiple Bias Level Reset Waveform for Enhanced DMD Control"; U.S. Pat. No. 5,768,007, entitled "Phase Matched Reset for Digital Micro-Mirror Device"; U.S. Pat. No. 5,764,208, entitled "Reset Scheme for Spatial Light Modulators"; and U.S. Pat. No. 5,706,123, entitled "Switched Control Signals for Digital Micro-Mirror Device with Split Reset," each of which patents is assigned to Texas Instruments Incorporated and each of which is incorporated herein by reference.

Figure 4A:
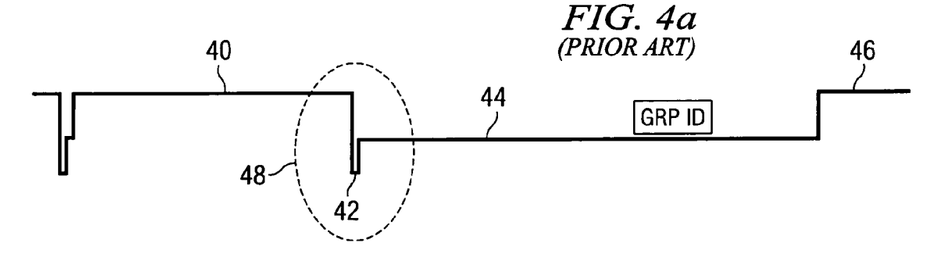
FIGS. 4a–b are graphs of a reset-release sequence and mirror position response.

An example of a prior art reset-release waveform is shown in FIG. 4a. Prior to executing a reset-release sequence, a DMD element has a bias voltage 40 applied to it, during which time the mirror is tilted at, e.g., about 10 degrees. A reset pulse 42 is applied to cause the mirror to return to a flat position, or about 0 degrees. Following the reset pulse is offset voltage 44, which allows a new address state to be loaded while the mirror is in a floating position. After this, a bias voltage 46 is again applied so that the DMD element may assume the new address state.

Figure 4B:
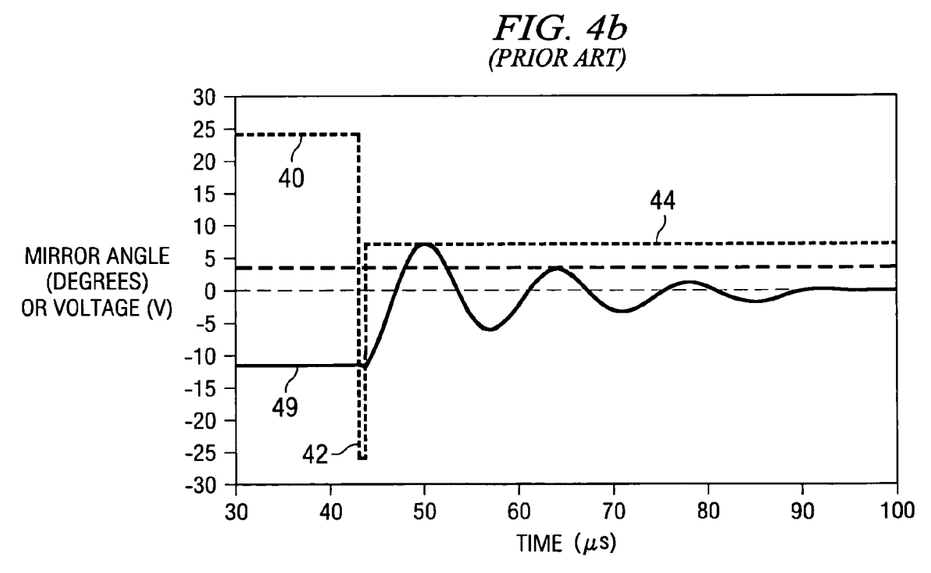

An expanded view of a portion 48 of the reset-release sequence, and its effect on mirror angle position 49, is shown in FIG. 4b. Initially, bias voltage 40 is applied, and the mirror is tilted at an angle of about 11–12 degrees. Reset pulse 42 causes the mirror to break free from surface stiction force and launch toward a neutral position. The reset pulse is followed by offset voltage 44 to complete the reset-release sequence. As can be seen in FIG. 4b, however, the mirror overshoots 0 degrees and experiences significant oscillation before settling to the 0 degree position. The overshoot and oscillation generally is undesirable and may cause visual artifacts. In particular, it can create black level, contrast, light leakage, and residual image problems. In addition, the extended oscillation may necessitate a long settling time before the bias voltage can be reapplied.

Figure 5:
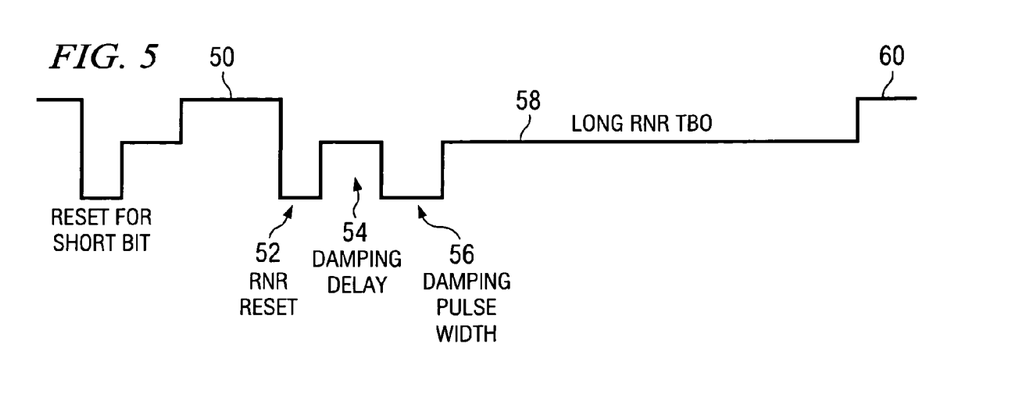
FIG. 5 is a graph of a damped reset-release sequence.

In accordance with a preferred embodiment of the present invention as shown in FIG. 5, these problems may be mitigated or eliminated by modifying the reset-release sequence with the addition of a damping or braking pulse to create a damped reset-release sequence. As before, bias voltage 50 is applied to a mirror element, followed by a reset-release sequence initiated by reset pulse 52. Instead of transitioning to a long offset voltage time period, a short damping delay 54 is introduced during which time an offset voltage is applied. The damping delay 54 allows sufficient time for the mirror to launch and achieve a small angular excursion from the original landing point. When the damping delay 54 time period expires, a damping pulse 56 is applied to the mirror element. The damping pulse 56 generates a retardation torque on the departing mirror, thus reducing some of the potential energy stored within the mirror spring tip and hinge, plus energy instilled by the reset pulse. This has the effect of damping down the magnitude of the oscillation around the neutral position, as well as reducing the mirror settling period. Depending on specific values chosen for various parameters, the final motion of the mirror may be over-damped, critically damped, or still under-damped, but at a reduced level. After the damping pulse, an offset voltage 58 is again applied to the mirror element, followed by the bias voltage 60 as before.

Figure 6A:
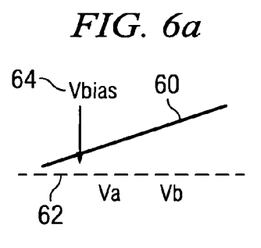
FIGS. 6a–6f are a graphical representation of a reset-release sequence applied to a micromirror device.
Figure 6B:
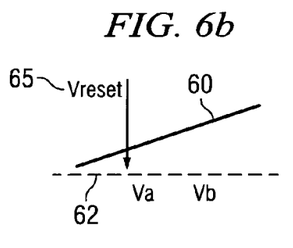
Figure 6C:
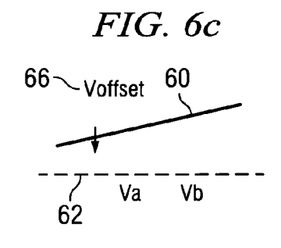
Figure 6D:
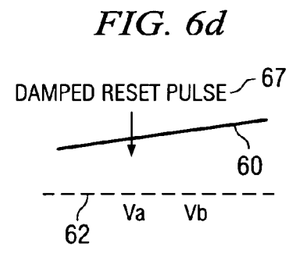
Figure 6E:
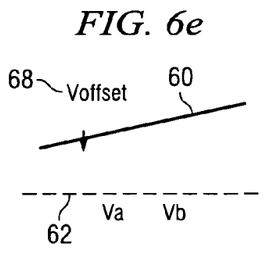
Figure 6F:
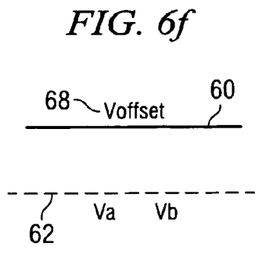

FIGS. 6a–f illustrate mirror position versus voltage forces applied to the mirror during a damped reset-release sequence. In FIGS. 6a–f, the relative length of the arrows generally shows a qualitative representation of the forces on the mirror. In FIG. 6a, mirror 60 is tilted and on landing pad 62, with bias voltage 64 being applied to hold mirror 60 down on landing pad 62. In FIG. 6b, a reset voltage 65 is applied to mirror 60, which will cause mirror 60 to break free and launch from landing pad 62. In FIG. 6c, an offset voltage 66 is applied to mirror 60 for the damping delay time period, during which time mirror 60 has started moving away from landing pad 62. After the damping delay time period expires, a damped reset pulse 67 is applied to the mirror as shown in FIG. 6d. The damped reset pulse generally is applied after mirror 60 has begun moving away from landing pad 62, but before mirror 60 has traveled to the neutral position. Once the damped reset pulse time period has finished, an offset voltage 68 is again applied to the mirror as shown in FIG. 6e. The mirror 60 then settles to the neutral position as shown in FIG. 6f.

Preferably, the widths of the damping delay and damping reset pulse are set to remove the most amount of energy from the mirror, while ensuring that there is enough margin against the mirror being called back to the original landing surface. The specific values may be determined experimentally based on the steady state operation of a mirror device. The parameters may be set such that the mirror travel to the neutral position is over-damped, critically damped, or may be under-damped but with reduced magnitude swings around the neutral position.

Figure 7:
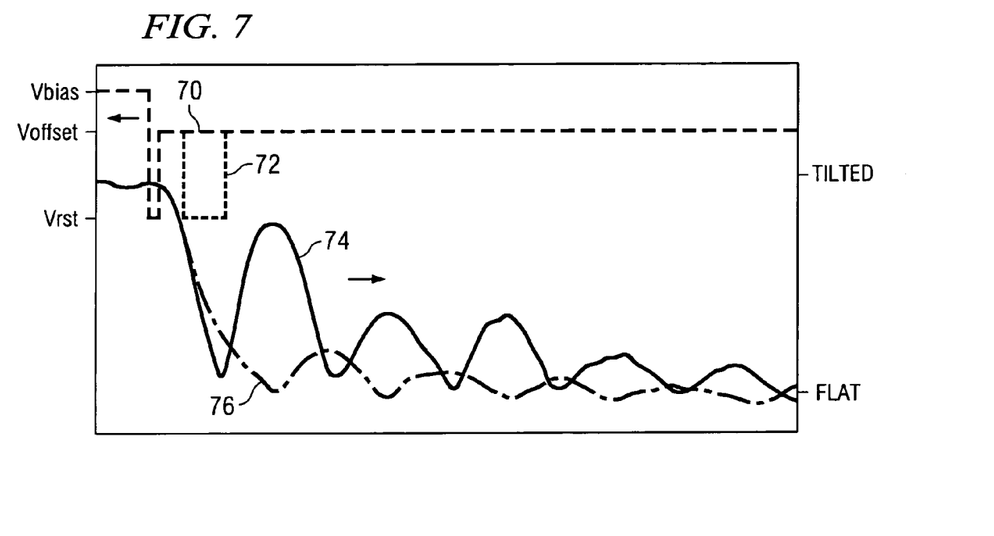
FIG. 7 is a graph comparing mirror position response of an undamped reset-release sequence to that of a damped reset-release sequence.

FIG. 7 is a graph comparing an undamped reset-release sequence with a damped reset-release sequence, and their respective effects on mirror displacement. Undamped reset-release sequence 70 and damped reset-release sequence 72 both return to an offset voltage after injecting a reset pulse. Undamped reset-release sequence 70 remains at the offset voltage for the remainder of the sequence. Damped reset-release sequence 72, however, injects another pulse after a damping delay time period. Trace 74 represents the mirror displacement generated by the undamped reset-release sequence 70. As can be seen in FIG. 7, there is a large displacement of the mirror and the mirror oscillates with relatively high magnitude for an extended period of time. In contrast, trace 76, which represents the mirror displacement generated by the damped reset-release sequence 72, has much smaller oscillations and dampens close to the final value much more quickly.

Figure 8A:
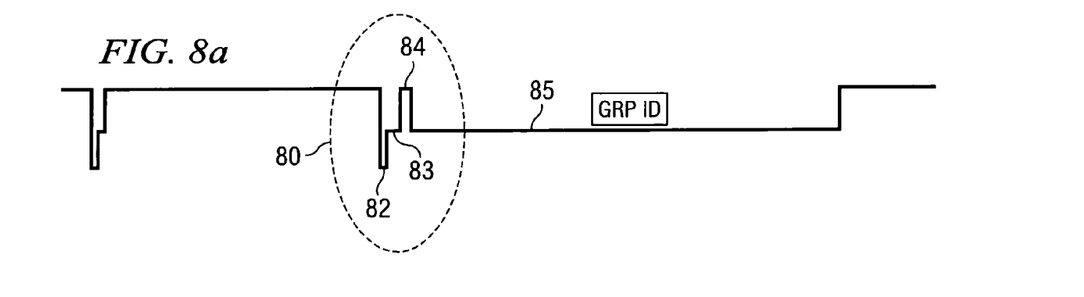
FIGS. 8a–b are graphs of a damped reset-release sequence.
Figure 8B:
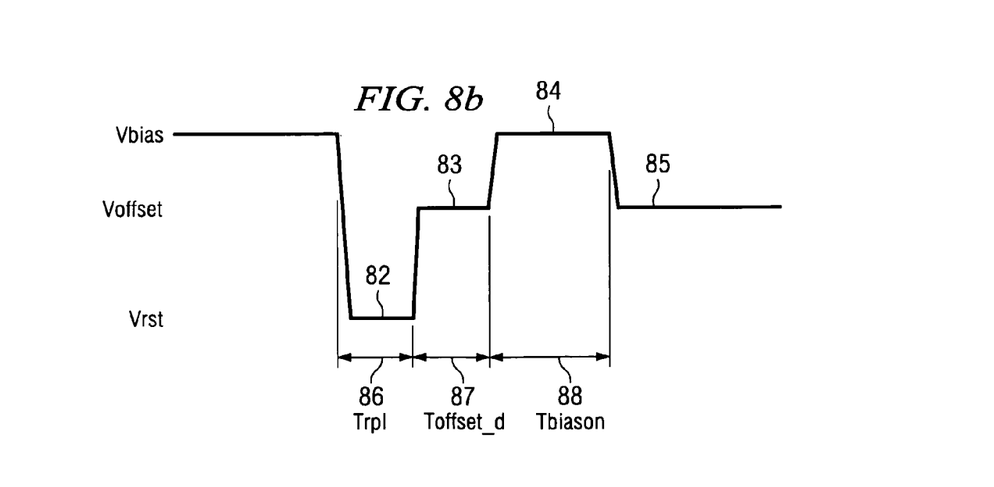

Variations of the damped reset-release waveform may be used in accordance with the present invention. One example of an alternative embodiment damped reset-release sequence is shown in FIGS. 8a–b, wherein FIG. 8b is an expanded view of portion 80 of the waveform shown in FIG. 8a. In this embodiment, after a reset pulse 82 and a damping delay 83, a damping pulse 84 in the opposite direction from the reset pulse 82 is applied to the mirror element. In this case, damping pulse 84 has the same voltage as the bias voltage instead of the reset pulse. Also in this case, the damping pulse has a polarity opposite that of the reset pulse. Damping pulse 84 provides an electrostatic force that opposes the motion of the pixel as it travels from the releasing side towards the flat state. Compared to the embodiment shown in FIG. 5, it also may have decreased attraction toward the non-releasing side, thus providing more net moment to damp the pixel oscillation.

Figure 9A:
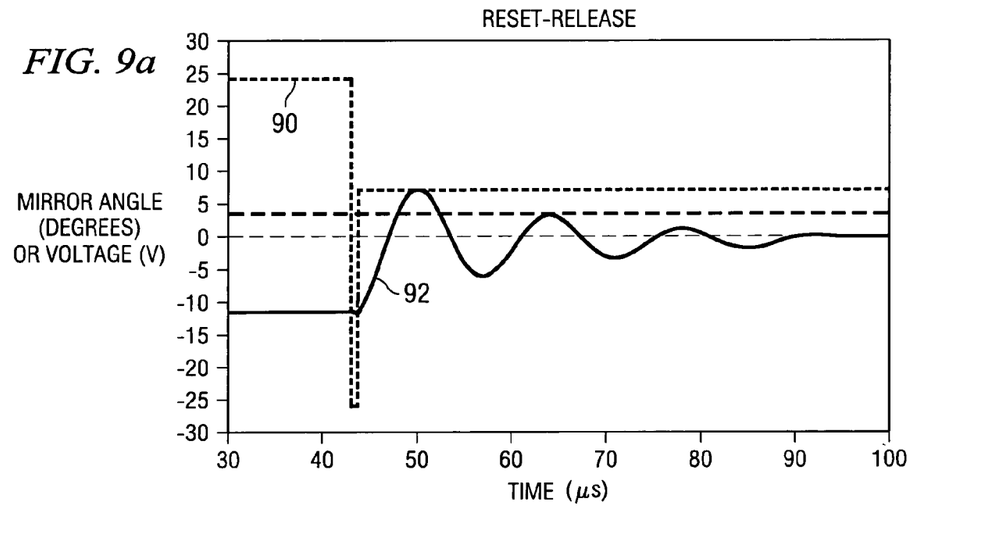
FIGS. 9a–b are graphs of mirror position response for a standard reset-release sequence and a damped reset-release sequence, respectively.
Figure 9B:
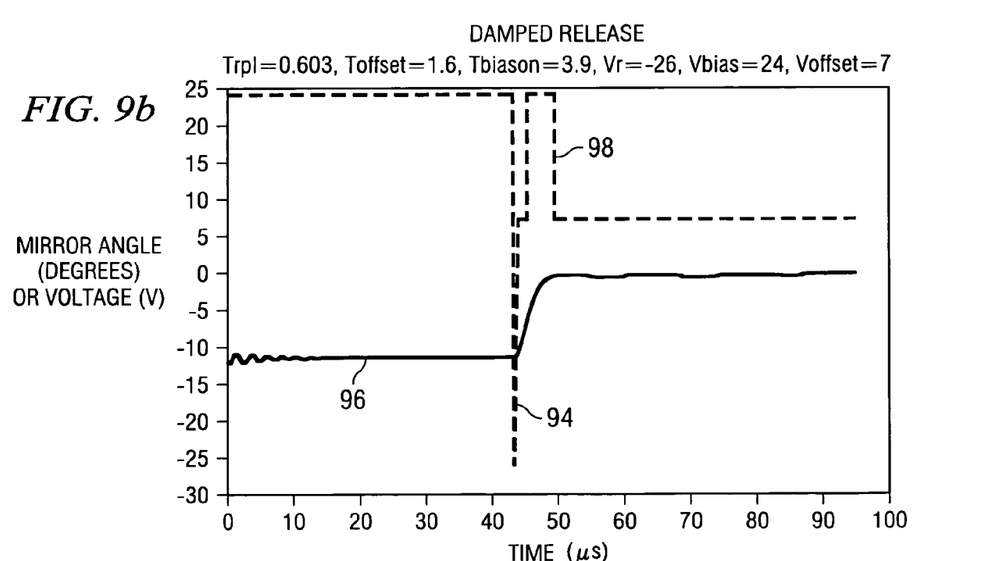

Referring now to FIGS. 9a and 9b, there is shown a comparison of mirror angle response for a standard reset-release and a damped reset-release. FIG. 9a illustrates standard reset-release waveform 90, and a model mirror angle response 92, which response has significant oscillation about the 0 degrees position before settling down to that position. In contrast, FIG. 9b illustrates damped reset-release waveform 94, and a damped mirror angle response 96. As readily seen in a comparison of FIGS. 9a and 9b, the addition of the damping pulse 98 to the damped reset-release has the effect of significantly damping the oscillations of the mirror angle about the 0 degrees position.

In this embodiment, voltage parameter values have been selected such that the reset voltage is –26 volts, the bias voltage is 24 volts, and the offset voltage is 7 volts. In addition, timing parameter values have been selected such that the reset pulse width is 0.6 microseconds, the damping delay time is 1.6 microseconds, and the damping pulse width is 3.9 microseconds. Because the bias voltage is used for the damping pulse, the damping pulse has a voltage of 24 volts, compared with the reset voltage value of –26 volts used in the embodiments of FIGS. 5 and 7. Of course, as with other embodiments, the specific values for the various parameters associated with the damped reset-release waveform, such as the voltage levels for the bias voltage, offset voltage, initial reset voltage, damping pulse voltage and the time periods for the release pulse time 86, damping delay time 87, and damping pulse time 88 (as shown in FIG. 8b), may be varied depending on the particular application.

Figure 10A:
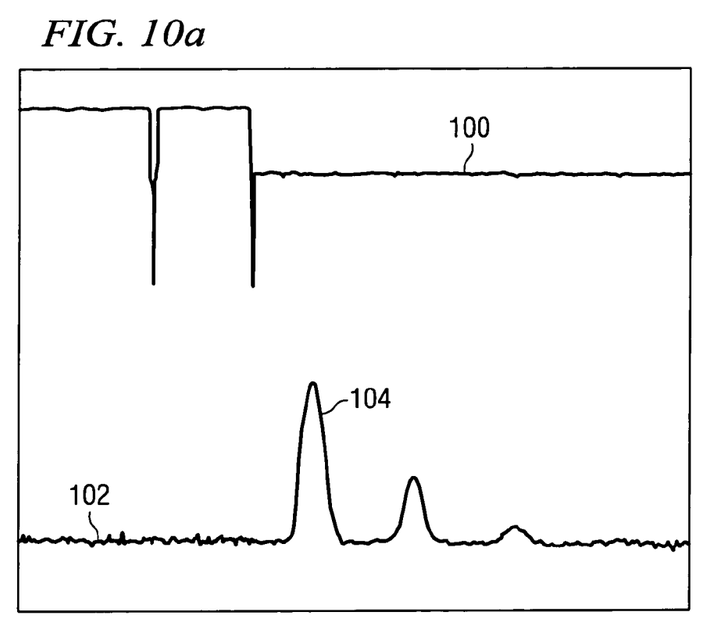
FIGS. 10a–b are graphs of black video content for a standard reset-release sequence and a damped reset-release sequence, respectively.
Figure 10B:
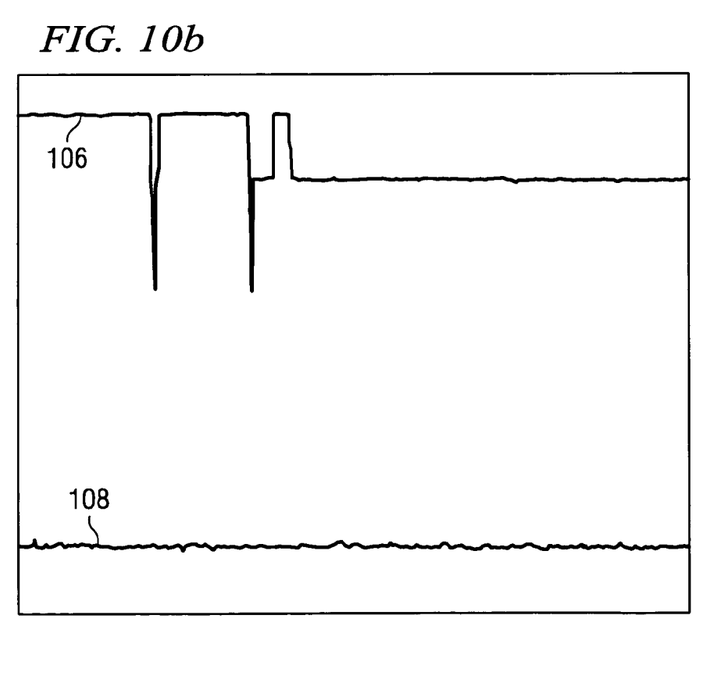

Another method of measuring the effect of mirror overshoot and oscillation is to measure the black level increase caused by the standard reset-release and the damped reset-release. FIG. 10a is a graph of the standard reset-release and FIG. 10b is a graph of the damped reset-release, with both graphs also illustrating the associated black video level. As illustrated by FIG. 10a, standard reset-release function 100 causes a substantial increase 104 in black video level 102, which increase is related to the amplitude of the first overshoot of the mirror position past the off-state. Subsequent decreasing spikes in the black level are caused by oscillation of the mirror position around the off-state. In comparison, the damped reset-release function 106 of FIG. 10b causes very little change in black video level 108.

Figure 11:
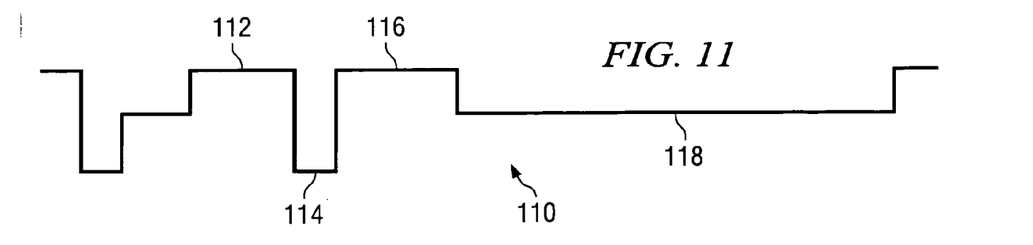
FIG. 11 is a graph of a damped reset-release sequence.

In accordance with another preferred embodiment of the present invention, an alternative reset-release function 110 is shown in FIG. 11. A reset pulse 114 follows bias voltage 112 as before. With this waveform, however, instead of using a damping delay at the offset voltage after the reset pulse, a damping pulse 116 is initiated immediately after the reset pulse 114. After damping pulse 116, the voltage level returns to offset voltage 118 for the remainder of the reset-release function 110. Although this waveform function may be useful in some applications, one potential problem with this embodiment in other applications is that this waveform may create too strong of a retarding moment and may not allow the mirror to successfully release from the landing zone.

In accordance with another preferred embodiment of the present invention, a damping pulse sequence may be used to suppress the resonant vibration of a mirror on a landing plate. As previously discussed, there may be a transient response introduced when a mirror is driven to a landing plate, either from that same landing plate (stay trajectory) or from the other landing plate (crossover trajectory). The transient response generally depends on the resonant frequency of the mirror and the resistance received from the ambient gas in which the mirror vibrates.

Figure 12A:
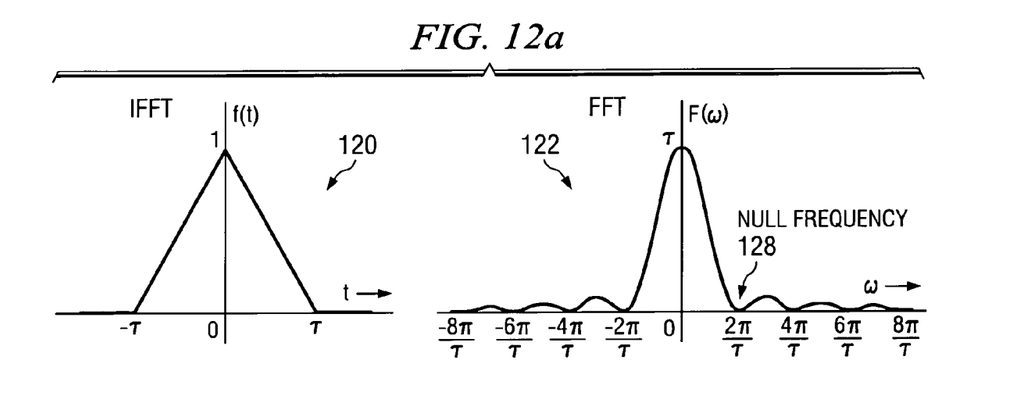
FIG. 12a is a graph of the time and frequency domain functions for a triangular pulse.
Figure 12B:
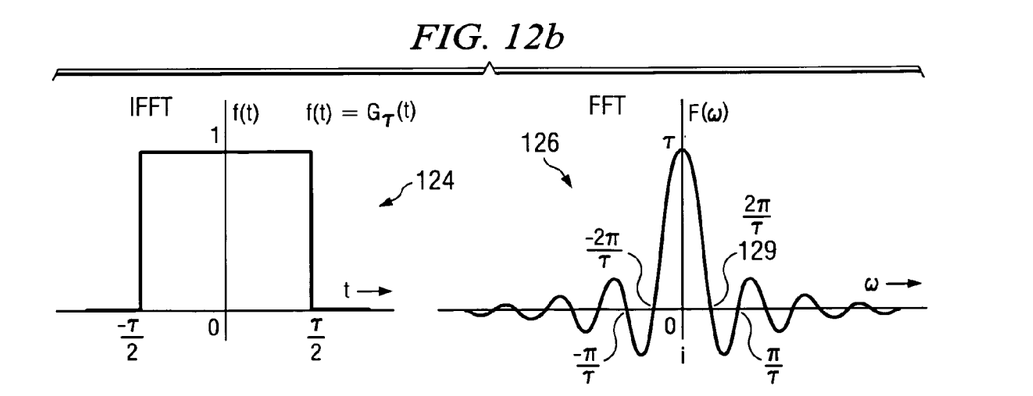
FIG. 12b is a graph of the time and frequency domain functions for a rectangular pulse.

To suppress this transient response, a triangular bias pulse may be added onto the bias voltage at about the time the mirror lands. Note that mirror land times may vary in a range of about, e.g., 1–2 μsec due to various factors such as hinge memory torqueing. Accordingly, a triangular pulse may be used because its effects are generally independent of the variety of landing times and of the phase of the resonant vibration. Referring now to FIG. 12a, there is shown a triangular pulse time domain function 120 and its associated spectrum density function 122. For comparison, FIG. 12b shows a rectangular pulse time domain function 124 and its associated spectrum density function 126. Triangular pulse function 120 generally can provide a wider range for filtering at, e.g., null frequency 128 compared with rectangular pulse function 124, which exhibits a steep rate of change at the null frequency 129.

By setting the null frequency of the triangular pulse function to the resonant frequency of the mirrors, the resonant vibration of the mirrors generally is not affected by electrostatic function force generated by the triangular pulse function on the bias voltage curve. Therefore, a triangular pulse function generally would only act on the mirrors to suppress their vibration even though the mirrors land at different times.

Figure 13A:
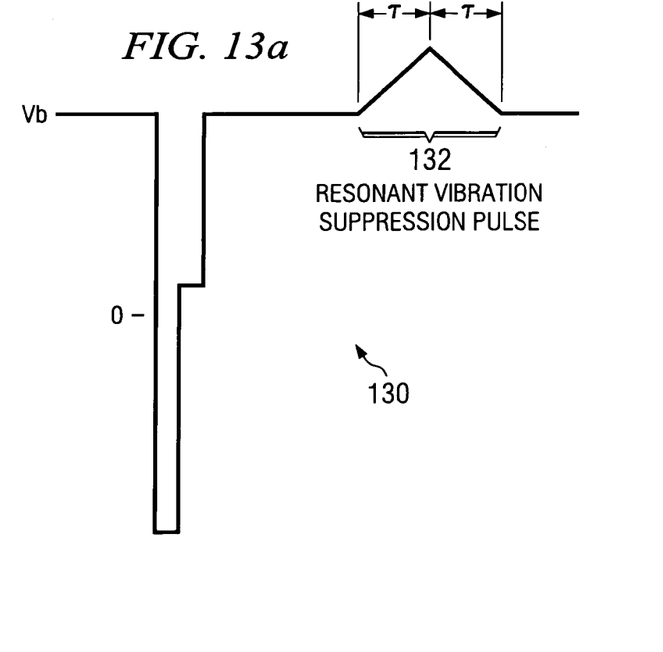
FIGS. 13a–b are damped reset sequences with one and two triangular pulses, respectively.
Figure 14:
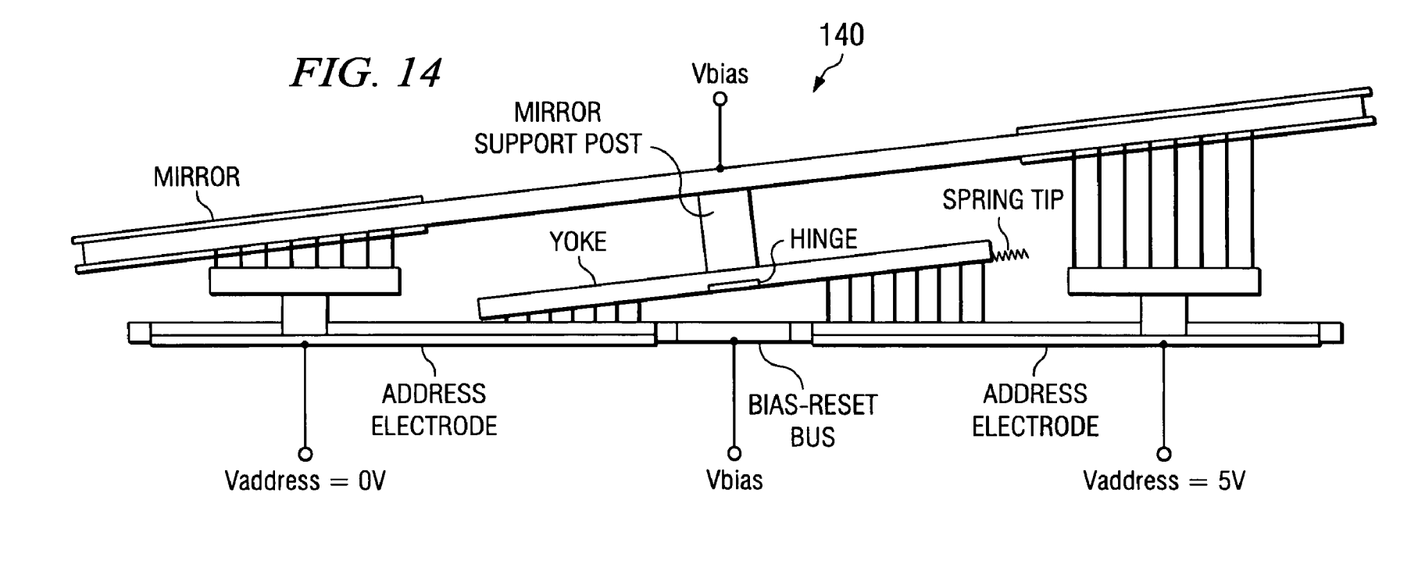
FIG. 14 is a graphical side elevation view of a DMD mirror element.

With reference now to FIG. 13a, there is shown a damped reset sequence 130 comprising a damping triangular pulse 132 for resonant vibration suppression of a DMD mirror such as the mirror 140 shown in FIG. 14. Damping triangular pulse 132 generally will damp the mirror transient response independent of the variation in the phasing of the mirror transient resonant vibration. The triangular shape of the pulse in the time domain is designed to have a zero frequency component near the transient resonant frequency of the mirror. Because the triangular pulse has other frequency components ranging from DC to higher frequencies except for the frequency near the transient resonant vibration, the pulse will dump the mirror vibration by the increase of electrostatic attractive force between mirror and address electrodes.

Figure 13B:
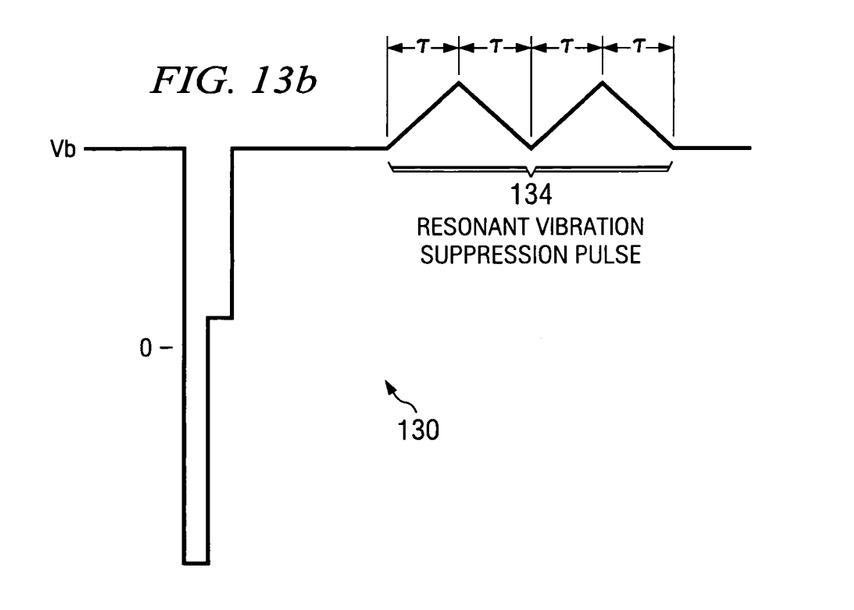

Assuming a resonant frequency of 550 kHz for the mirrors, tau of triangular pulse 132 may be set to, e.g., 1.82 μsec. This value may be modified depending on the specific application and its actual resonant frequency. For example, tau may be set to about 2.22 μsec for a 450 kHz resonant frequency. In addition, the number of triangular pulses may be varied from the singular pulse shown in FIG. 13a. For example, there may be two pulses as shown in the damped reset sequence 134 of FIG. 13b. The number of pulses, the pulse width, and the pulse energy may vary depending on the specific application and may be chosen to maximize their effect on transient resonant vibration suppression and on stabilization.

Figure 15:
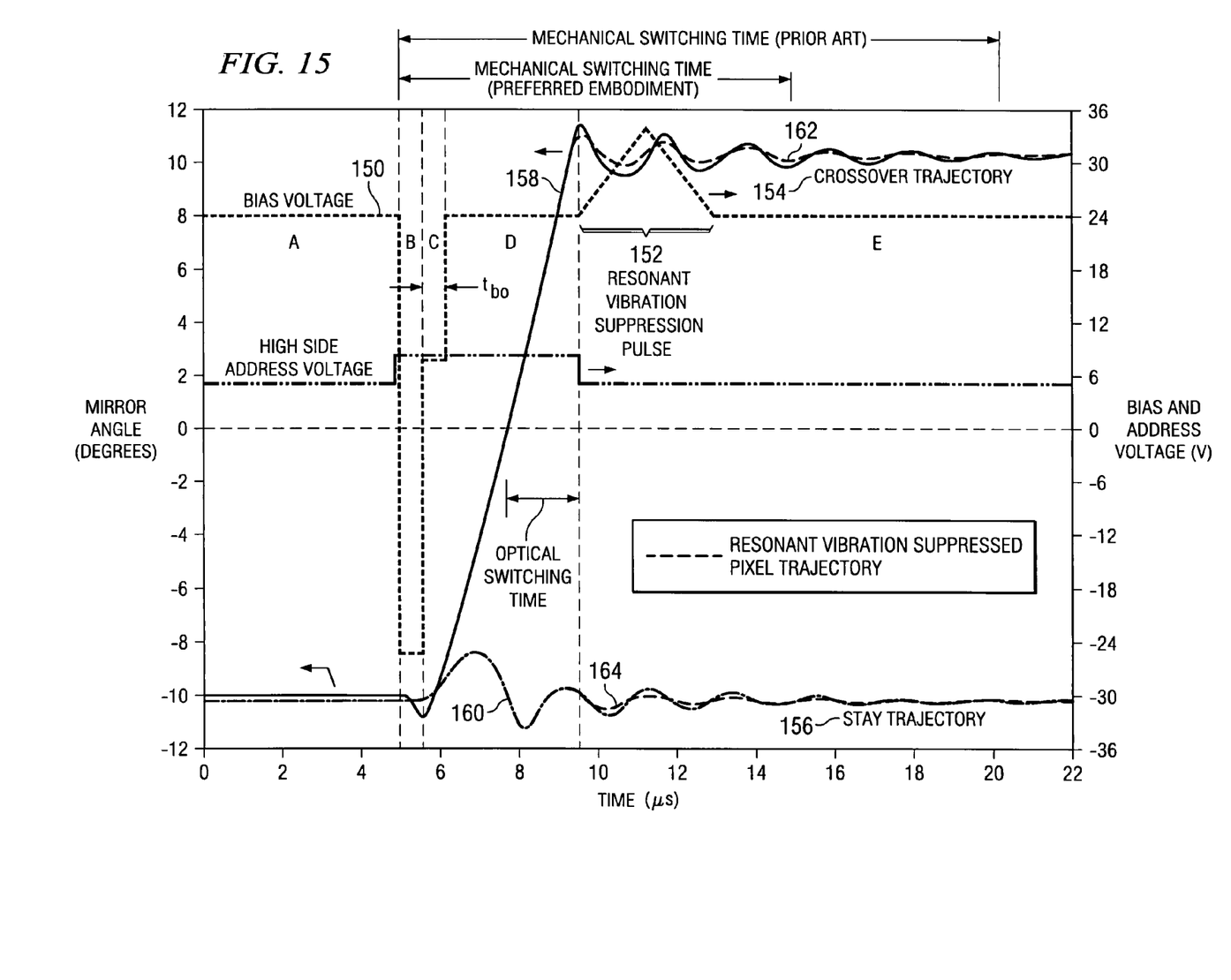
FIG. 15 is a graph of a damped reset sequence and its associated mirror angle response.

The effect of a single triangular pulse is illustrated in FIG. 15. In this graph, a damped reset sequence 150 is shown with a damping triangular pulse 152. The mirror angle response to this sequence is also shown, both for crossover trajectory angle 154 and stay trajectory 156. In the figure, the solid line crossover trajectory 158 and the dashed line stay trajectory 160 represent the mirror angle response to a voltage function with no damping pulse. Likewise, dotted line 162 represents the crossover trajectory response and the dotted line 164 represents the stay trajectory response to a voltage function with the damping pulse 152. As can be seen in FIG. 15, the damping pulse suppresses mirror resonance after landing, stabilizing the mirror more quickly and enabling a shorter mechanical switching time.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that pulse widths, voltage levels and voltage polarities may be varied while remaining within the scope of the present invention. In addition, the damping pulses disclosed herein may be used when driving a mirror to a neutral position or to a landing position, and the features described with respect to one embodiment may be utilized by other disclosed embodiments.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a digital micromirror device having at least one micromirror, the method comprising:
    applying a reset voltage pulse to the micromirror;
    applying an offset voltage to the micromirror immediately after the reset voltage pulse;
    applying a bias voltage to the micromirror immediately after the offset voltage, wherein the bias voltage is applied for a damping delay period;
    applying a triangular damping pulse to the micromirror after the damping delay period, whereby the triangular damping pulse reduces a transient resonant vibration of the micromirror on a first landing plate; and
    reapplying the bias voltage to the micromirror.

2. The method of claim 1, wherein the reset voltage pulse causes the micromirror to launch from a second landing plate.

3. The method of claim 2, wherein the triangular damping pulse is applied at about a time when the micromirror is landing on the first landing plate.

4. The method of claim 1, further comprising applying a second triangular damping pulse to the micromirror before the reapplying of the bias voltage.

5. The method of claim 1, wherein the vibration has a resonant frequency of between about 450 kHz and about 550 kHz, and the width of the triangular damping pulse is between about 3.64 microseconds and 4.44 microseconds.

6. The method of claim 1, wherein the reset voltage is about −26 volts, the offset voltage is about 7 volts, and the bias voltage is about 24 volts.

7. The method of claim 6, wherein the triangular damping pulse has a peak voltage of greater than about 30 volts.

8. A method of operating a digital micromirror device having at least one micromirror, the method comprising:
    applying a reset voltage pulse to the micromirror, wherein the reset voltage pulse causes the micromirror to launch from a landing plate;
    applying an offset voltage to the micromirror immediately after the reset voltage pulse, wherein the offset voltage is applied for a damping delay period, wherein the micromirror launches and is moving away from the landing plate before an expiration of the damping delay period;
    applying a triangular damping pulse to the micromirror immediately after the offset voltage; and
    reapplying the offset voltage to the micromirror, whereby the triangular damping pulse reduces oscillation of the micromirror about a neutral position.

9. The method of claim 8, wherein the triangular damping pulse has a same polarity as the reset voltage pulse.

10. The method of claim 8, wherein the triangular damping pulse has an opposite polarity from the reset voltage pulse.

11. The method of claim 8, further comprising:
    loading an address state for the micromirror during the reapplying of the offset voltage; and
    applying a bias voltage to the micromirror, wherein the micromirror assumes the address state.

12. The method of claim 8, wherein the reset voltage is about −26 volts and the offset voltage is about 7 volts.

13. The method of claim 8, wherein the damping delay period is greater than 1 microsecond.

14. The method of claim 13, wherein the damping delay period is about 1.6 microseconds and the damping pulse is about 3.9 microseconds long.

* * * * *